US010555278B2

(12) United States Patent
Ghosh

(10) Patent No.: US 10,555,278 B2
(45) Date of Patent: Feb. 4, 2020

(54) METHOD AND ARRANGEMENT FOR ALLOCATING COMMUNICATION RESOURCES IN A COMMUNICATION NETWORK

(71) Applicant: Comptel OY, Helsinki (FI)

(72) Inventor: Tirthankar Ghosh, Pune (IN)

(73) Assignee: Comptel Oy, Helsinki (FI)

( * ) Notice: Subject to any disclaimer, the term of this patent is extended or adjusted under 35 U.S.C. 154(b) by 0 days.

(21) Appl. No.: 15/802,498

(22) Filed: Nov. 3, 2017

(65) Prior Publication Data

US 2019/0141676 A1 May 9, 2019

(51) Int. Cl.
*H04W 72/04* (2009.01)
(52) U.S. Cl.
CPC .................................. *H04W 72/04* (2013.01)
(58) Field of Classification Search
CPC ...................................................... H04W 72/04
See application file for complete search history.

(56) References Cited

U.S. PATENT DOCUMENTS

| 6,947,987 B2* | 9/2005 | Boland | G06F 9/5016 709/226 |
| 2008/0077663 A1* | 3/2008 | Zarenin | H04L 41/0853 709/203 |
| 2016/0373941 A1* | 12/2016 | Daijavad | H04W 24/02 |

FOREIGN PATENT DOCUMENTS

WO WO-2011112132 A1 * 9/2011 ........... H04B 7/0452

* cited by examiner

*Primary Examiner* — Curtis A Alia

(57) ABSTRACT

The invention provides a method for allocating communication resources in a communication network that comprises a number of different devices and utilizes different technologies. Information is collected of the number of devices of the network. The collected information is transformed from their formats to a common format. The common format makes it possible to handle efficiently all information. Current resources of the communication network and current use of the resources are determined utilizing the collected information in the common format. Alternative ways to use the resources are investigated instead of the current use, and a suggestion(s) is made to use at least one alternative way in case it is more efficient than the current use.

20 Claims, 5 Drawing Sheets

METHOD AND ARRANGEMENT FOR ALLOCATING COMMUNICATION RESOURCES IN A COMMUNICATION NETWORK

PRIORITY

This application does not claim priority of any other applications.

FIELD OF TECHNOLOGY

The invention relates to allocation methods and arrangements that are used for allocating communication resources in a communication network. The communication network can be partly or entirely a mobile communication network.

BACKGROUND

Nowadays a communication network comprises a variety of different devices and techniques. There are several generations of networks like 2G, 3G and 4G, which are under use in mobile communication networks. Since the techniques of said generations are different, the communication network, which a user experiences, can actually be one of said generations or even a combination of them. In addition, different network generations may be connected with each other. Each network technique requires specific devices so the mobile communication network has a great number of different devices and management systems.

Network operators have a great collection of different device types, including routers, firewalls, session border controllers, switches, aggregators, VPN gateways, and a variety of other device types. These devices are constantly being developed and acquired, so equipment rapidly becomes obsolete and should be replaced. The launch of new services often demands network reconfiguration and on-site installation of new equipment which in turn requires additional space and power. Further maintenance staff must be trained to take care of the new devices. In addition some devices may spend plenty of time unused, so the network can have unused capacity, which is not utilized efficiently due to a great variety of the network devices and techniques.

Further, network functions can be virtualized in order to be processed on normal servers, like x86 servers. The network function virtualization (NFV) makes it possible to replace traditional network devices with software that exists on servers. This software performs the network functions previously provided by dedicated hardware. The combination of a server and software can replace a wide range of network devices, from switches and routers to firewalls and VPN (virtual private network) gateways. These new solutions may run on physical servers, virtual machines controlled by hypervisors hosted by appropriate hardware (e.g. server) or a combination of them. As can be noted, it is very challenging to allocated resources of a modern communication network.

SHORT DESCRIPTION

The object of the invention is to alleviate the problem said above, namely the allocation of network resources of the communication network. The object is achieved in a way described in the independent claims. Dependent claims illustrate different embodiments of the invention.

The invention provides a method for allocating communication resources in a communication network that comprises a number of different devices and utilizes different technologies. Information is collected of the number of devices of the network. The collected information is transformed from their formats to a common format. The common format makes it possible to handle efficiently all information. Current resources of the communication network and current use of the resources are determined utilizing the collected information in the common format. Alternative ways to use the resources are investigated instead of the current use, and a suggestion(s) is made to use at least one alternative way in case it is more efficient than the current use.

BRIEF DESCRIPTION OF THE FIGURES

In the following, the invention is described in more detail by reference to the enclosed drawings, where.

DESCRIPTION OF THE INVENTION

Figure 3:
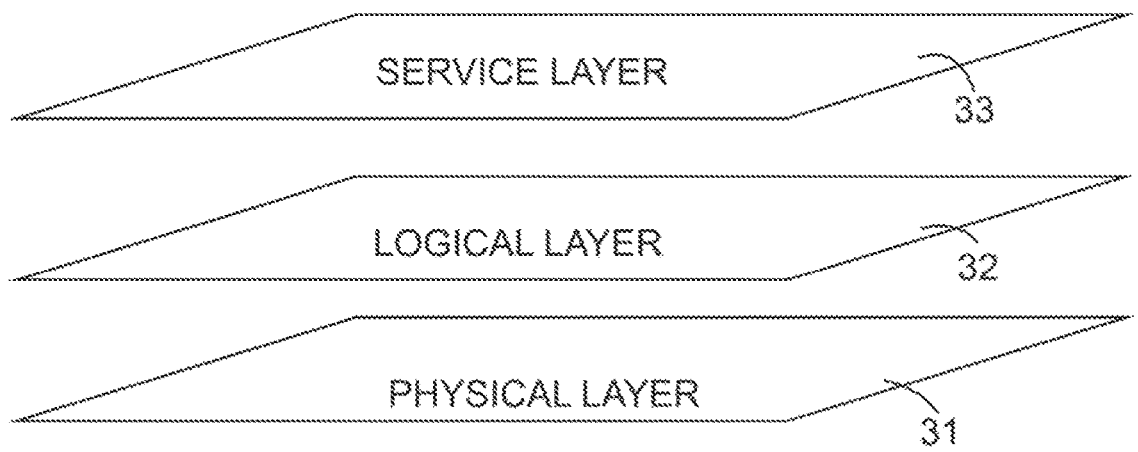
FIG. 3 illustrates an example of a three layer model of the invention.

FIG. 3 illustrates a simplified example of a mobile communication network 106 utilizing 3G and 4G technologies. In this example a mobile phone 104 is in connection with a node 112 (base station), which in turn is in connection with a serving GPRS Support Node (SGSN) 114. So the mobile phone 104 utilizes the 3G network. Another mobile phone 102 is in connection with another node 110 (base station), which in turn is in connection with a SGW (Serving Gateway) 118. So the other phone utilizes the 4G network in this example.

The SGSN 112 is the node that serves user devices like mobile phones or other mobile devices. The SGSN supports GPRS and/or UMTS (Universal Mobile Telecommunications System). The SGSN keeps track of the location of an individual user device and performs security functions and access control, and delivers data packets from and to the mobile stations within its geographical service area. The location register of the SGSN stores location information (e.g., current cell, current VLR) and user profiles.

The SGSN node is connected to a gateway GPRS support node (GGSN) 116 that is a main component of the GPRS network. The GGSN is responsible for the internetworking between the GPRS network and external packet switched networks, like the Internet and X.25 networks, in this example to networks 128 and 126.

The GGSN can be seen a router to a sub-network, because the GGSN hides the GPRS infrastructure from an external network. When the GGSN receives data addressed to a specific user, it checks if the user is active. If it is, the GGSN forwards the data to the SGSN serving the mobile user, but if the mobile user is inactive, the data is discarded. In the other direction, mobile-originated packets are routed to the right network by the GGSN. The GGSN converts the GPRS packets coming from the SGSN into the appropriate packet data protocol (PDP) format (e.g., IP or X.25) and sends them out on the corresponding packet data network. In the other direction, PDP addresses of incoming data packets are converted to the GSM address of the destination user.

The SGW 118 routes and forwards user data packets, while also acting as the mobility anchor for the user plane during inter-eNodeB handovers and as the anchor for mobility between LTE (Long Term Evolution) system, commonly marketed as 4G LTE, and other technologies. It manages and stores UE (User Equipment) contexts, e.g. parameters of the IP bearer service, and network internal routing information.

A PGW gateway (PDN Gateway) 120 provides connectivity from the UE to external packet data networks by being the point of exit and entry of traffic for the UE. A UE may have simultaneous connectivity with more than one PGW for accessing multiple PDNs. The PGW performs policy enforcement, packet filtering for each user, charging support, etc. Another key role of the PGW is to act as the anchor for mobility between 3GPP and non-3GPP technologies. In this example the PWG 120 is connected to the network 126, which is also in connection with the SGSN node 116.

Policy and Charging Rules Function (PCRF) 122 is the node designated in real-time to determine policy rules in a multimedia network. As a policy tool, the PCRF plays a central role in next-generation networks. Unlike earlier policy engines that were added onto an existing network to enforce policy, the PCRF is a software component that operates at the network core and accesses subscriber databases and other specialized functions, such as a charging system, in a centralized manner.

The PCRF is the part of the network architecture that aggregates information to and from the network, operational support systems, and other sources (such as portals) in real time, supporting the creation of rules and then automatically making policy decisions for each subscriber active on the network. Such a network might offer multiple services, quality of service (QoS) levels, and charging rules. PCRF can provide a network agnostic solution (wire line and wireless).

A subscriber profile repository, SPR, 124 holds subscription data like allowed services, location information, user identities (MSISDN, IMSI), authentication data etc.

Figure 1:
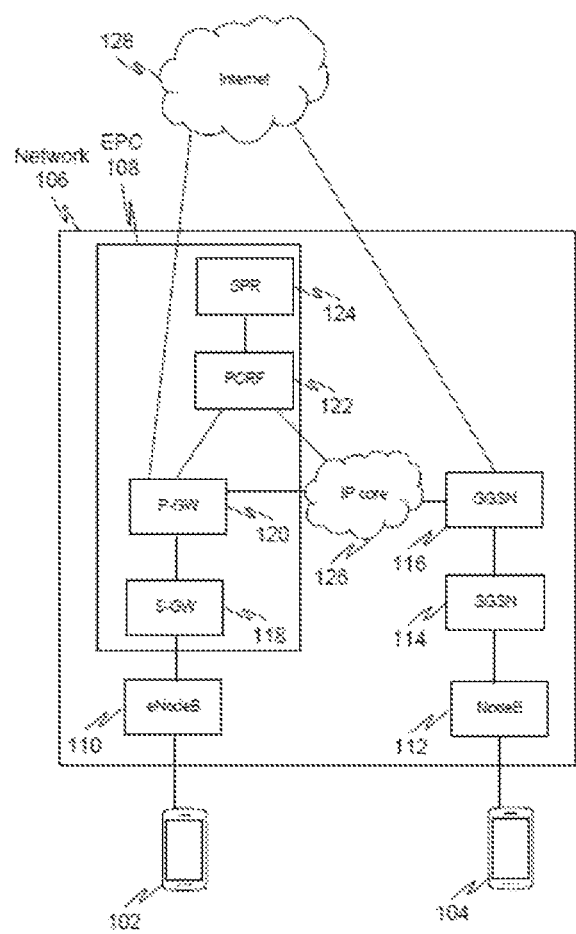
FIG. 1 illustrates an example of a mobile communication network utilizing 3G and 4G technologies.

As can be seen from the simple example of FIG. 1 the communication network contains a number of different techniques and devices. As already said above, tasks carried out by the communication devices may be virtualized in order to provide a virtual network function (VNF). Nowadays processors and network adapters provide greatly increased throughput and processing capability making the virtualization possible.

Figure 2:
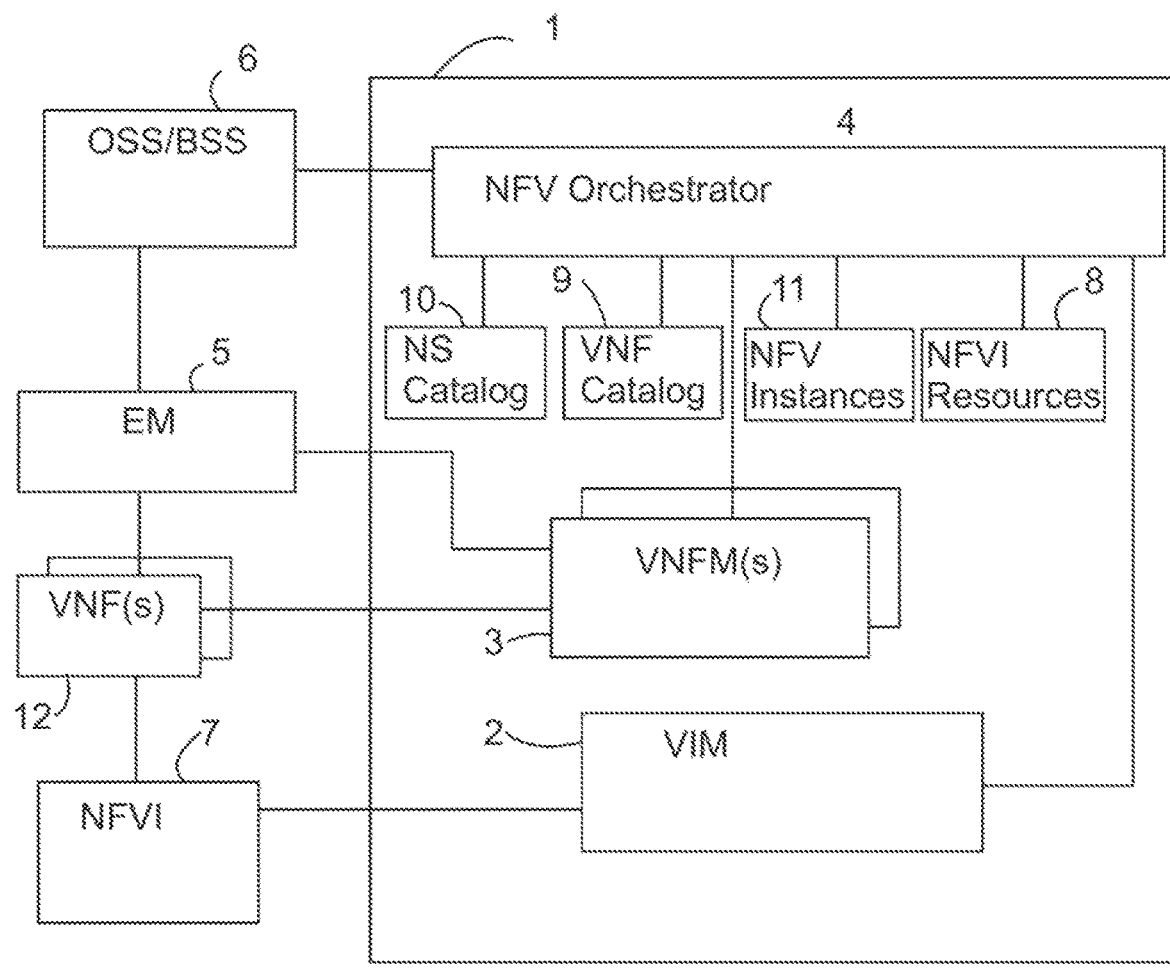
FIG. 2 illustrates an example of a structure of VNS.

FIG. 2 illustrates an example of the structure of the NFV. As all communication network techniques, the NFV needs also management system which is called a NFV Management and Orchestration (MANO) 1. The MANO comprises several managers, a VIM manager (Virtualized Infrastructure Manager) 2, a VNM manager(s) (VNFM) 3, and a NFV orchestrator (NFVO) 4. The VNFM is connected to a traditional element management (EM) 5, and the NFVO to a traditional OSS/BSS (Operational Support System/Base Station Subsystem) 6. The traditional systems exchange information with the MANO.

Further, FIG. 2 shows a NFVI (NFV Infrastructure) 7 that illustrates underlying infrastructure including servers, storages etc, virtual resources (Virtual Machines) and software resources (hypervisor) in the NFV environment). The VIM manages NFVI resources in one domain.

It is possible that there may be multiple VIMs in the NFV architecture, each managing its respective NFV Infrastructure (NFVI). The VIM further manages life cycle of virtual resources in an NFVI domain, keeps inventory of virtual machines (VMs) associated with physical resources, provide performance and fault management of hardware, software and virtual resources, and exposes physical and virtual resources to other management systems.

The VNFM 3 manages VNFs 12. VNFs are virtualized network elements like Router VNF, Switch VNF etc. The VNFM manages life cycle of VNFs. It creates, maintains and terminates VNF instances. Further, the VNFM handles fault, configuration, accounting, performance and security management tasks of VNFs. As showed in FIG. 2, there can be multiple VNFMs managing separate VNFs or there can be one VNFM managing multiple VNFs.

The NFVO 4 coordinates, authorizes, releases and engages NFVI resources among different artificial interface points or point between communicating entities, which are also called points of presence (PoP). The connections with the VIMs are made through the NFVI APIs (Application Programming Interface) instead of engaging with the NFVI resources, directly. So, resource allocation from different VIMs is handled in this way.

Service Orchestration creates end to end service between different VNFs. It achieves this by coordinating with the respective VNFMs so it does not need communicate to VNFs directly. For example, a service between the base station VNF's of one vendor and core node VNF's of another vendor can be created. The Service Orchestration can instantiate VNFMs if needed and it handles a topology management of the network services instances.

There are also four types of repositories: a VNF catalogue 9, a network services (NS) catalogue 10, NFV Instances 11, and NFVI resources 8.

The VNF Catalogue 9 is a repository of all usable VNFDs (VNF Descriptor). The VNFD is a deployment template which describes a VNF in terms of its deployment and operational behaviour requirements. It is primarily used by VNFM in the process of VNF instantiation and lifecycle management of a VNF instance. The information provided in the VNFD is also used by the NFVO to manage and orchestrate network services and virtualized resources on NFVI.

The NS catalogue 10 is list of the usable network services. A deployment template for a network service in terms of VNFs and description of their connectivity through virtual links is stored in NS Catalogue. The NFV Instances 11 holds all details about network service instances and related VNF Instances. The NFVI Resource repository 8 is a repository of resources utilized for the purpose of establishing NFV services.

As can be noted from the above description the communication network has a great number of different devices and structures, further there are new solutions which works together with previous devices. It infrastructure of the network is changing all the time. In order to allocate network resources in this challenging environment the invention provides a solution how the take into account different resources and their types. FIG. 2 shows also possible connection between different entities of the NFV system.

FIG. 3 illustrates how the invention can be modelled in three layers, a physical layer 31, a logical layer 32 and a service layer 33. The physical layer comprises network devices like routers, switches, servers, aggregators, links, cables etc. The logical layer describes the network how it is arranged to work, for example routes and devices form which communication paths comprise. The logical layer can also comprise network functions such as, routers and switches (VNFs in a virtualized network). The layering provides for flexibility to store information in a decoupled fashion. The communication paths and service are determined on the service level. It may be said that the service level comprises applications wherein tasks of the logical layer are created, followed and terminated. The resource allocation is made in the service level, which utilized the other levels below. In addition, when modelling the invention as different layers it makes it easier to handle network technology specific extension data models, which can be added or modified in the inventive system. Therefore the inventive system can be conveniently updated to handle different network technologies.

Figure 4:
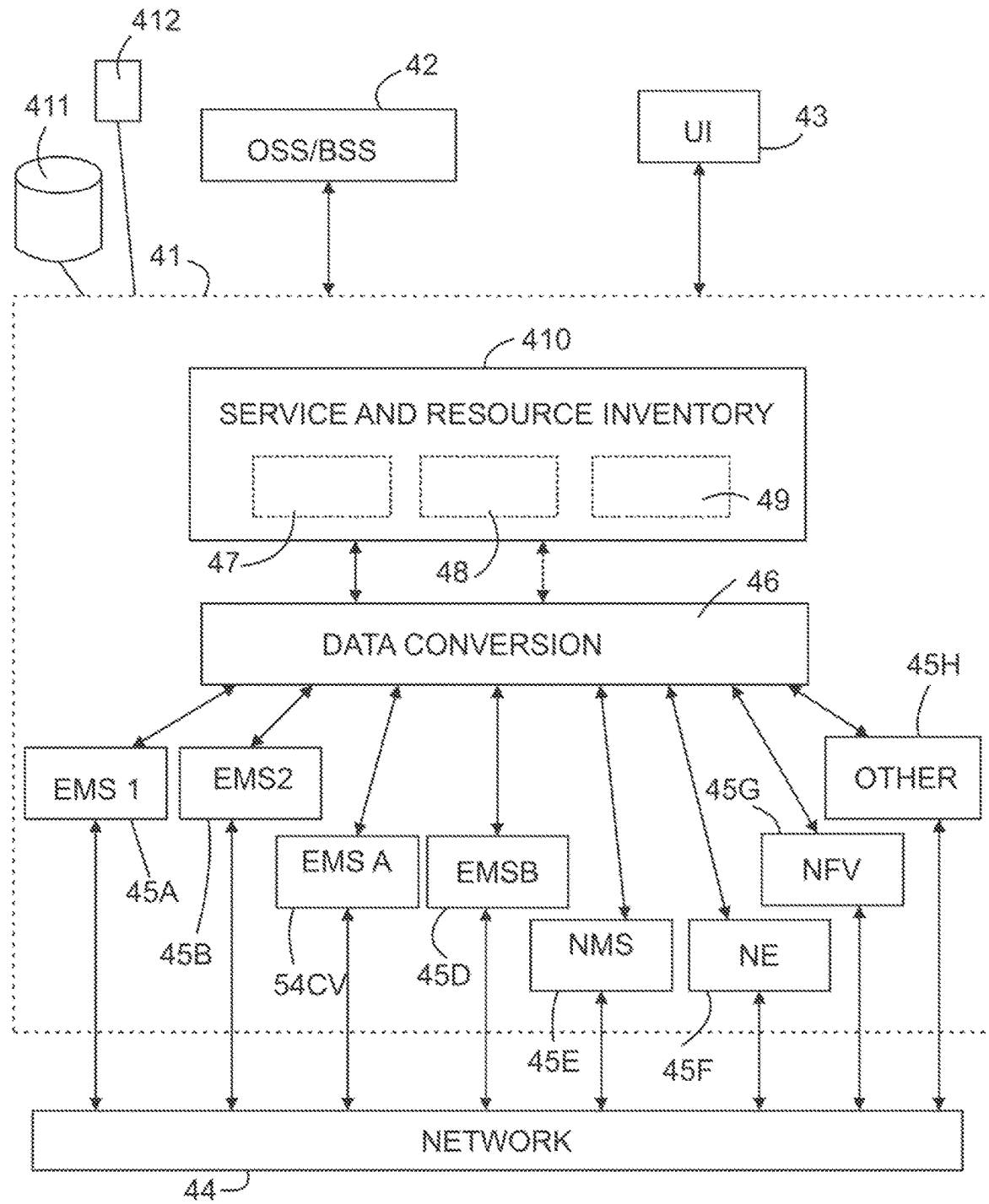
FIG. 4 illustrates an example of a structure of the invention.

FIG. 4 illustrates a structure of the invention. The invention has a service and resource inventory (SRI) system 41 that is a software solution designed to collect and store information about resources and services related to the communication network(s) 44. Although the software solution is a convenient way to perform the invention, is also possible to utilize hardware, like special circuits, if it is considered to be reasonable. It should be noted that FIG. 4 is only an illustration how the invention can be constructed. The different component of the system can also be arranged in different ways than showed in FIG. 4.

The information of the networks and their elements is required by many of OSS/BSS and other systems 42. If the information is incorrect or outdated, the processes may suffer, or fail completely so the SRI system offers methods for maintaining accuracy of the network information. In FIG. 4 some functions/components of the system are illustrated inside one component 410, which is described later in the text.

The SRI system can store details about networks and services and other relevant information. The SRI system stores information based on TMF Information Framework (previously known as SID) data model. It should be noted that the SRI is also flexible enough to incorporate other data models, which could be found more beneficial in the future, which can record a wide range of entities including, but not limited to logical resources and services, and physical resources and locations. The logical resources and services are, for example, customers, organisations, products, customer facing and resource facing services, agreements, SLAs, logical ports, sub-interfaces, circuits, channels, identifiers, profiles, configurations, IP-addresses, VLAN numbers, communication protocols, routing tables, network domains, VPNs. The physical resources and locations are, for example, network elements, chassis, slots, cards, ports, fibres, copper paths, patch cables, locations, regions, sites, buildings, floor space, racks, geographic coordinates.

The information in the SRI system is organised into object classes, to make it easier to find specific types of resources or services. The data model defines how various classes can be related to each other, so that it is possible to systematically trace from one type of resource to another. For example, how a card is contained by a slot which is part of a chassis in a site, or how a service is using a circuit within a fiber path and two ports.

The system is used to document the total capacity of a resource, how much of that capacity is used and available (for example free slots in a chassis or used channels in a circuit). It can also store how end-to-end services run across the network, including directly underlying resources such as ports, circuits, cross connections, VLAN IDs, IP addresses, as well as indirectly related objects such as card, chassis, site, geo-location, network circuits and physical links. So resource allocation is possible.

This SRI can also be modified and extended to support new entities, technologies and services. SRI provides technology and vendor specific "technology templates" for a wide range of network technologies, such as xDSL, ISDN, PSTN, GPON, Carrier Ethernet, MPLS, L2, L3 VPN, and NFV solutions.

The SRI system is designed to allow easy access to information about logical and physical resources for critical processes such as service delivery, fallout management, fault management, capacity management, trouble resolution and more. interfaces 43 like user interfaces or APIs (Application Program Interfaces, web services) allow external systems to retrieve information, update information or execute functions in SRI. So, the RSI information can be exposed to other systems.

Management systems can request SRI to check service feasibility and resource availability before a service is delivered, and to allocate resources, such as physical and logical ports, VLAN circuits to a service during delivery. The system can record the installed services and configurations, to help future changes.

Fault management systems can request service and resource topology information in order to analyse the impact of a fault, or update the inventory when a fault is detected to prevent services to be delivered on a faulty resource. Trouble resolution processes may request a cause analysis to find out which resources are used to provide a service, and if any of them are marked as faulty.

The SRI system also allows new APIs to be created by customers and partners, to provide simple or complex functions for reading or changing information in the inventory. The SRI APIs are open, so any system requiring inventory information can access them, and even have dedicated APIs created to offer the needed information.

As already said above the SRI system has a user interface or interfaces Uls, like GUIs (Graphical User Interface) or APIs to view and handle resources and services. The interfaces can have different types of views like an equipment view and a topology view etc. The Equipment View can be used to see a graphical presentation of devices and related items, including rooms, racks, chassis, cards and ports. The topology view can display how various nodes (such as sites, devices, services and customers) are linked together by for example logical or physical circuits.

In order to maintain correct and up-to-date information about the network, SRI can collect/discover information from the network and compare it with the information in the inventory. Information from the network can be collected from Element Management Systems (EMS), Network Management Systems (NMS) or directly from the Network Elements (NEs), NFVs or other system like other repositories.

Most modern network elements have the ability to expose information about themselves, such as: their name, address, number of slots, cards and ports, their physical configuration (number of slots, cards and ports), their logical configuration (logical devices, IP addresses, sub-interfaces, connected circuits and channels, services etc.), and the state of these resources (e.g. this port is up, and in use)

Collecting or discovering is a process used to identify devices and new devices and their data in the network. In most cases, the discovery can be handled by Element or Network Management Systems (EMS or NMS), and the SRI system can collect a ready-made list of devices. But the SRI can also be configured to do discovery by tracing IP networks, or by scanning known ranges of IP addresses. The lists will normally contain a minimum set of information, such as the device type, name and IP-address. Upload function can be used to extract detailed data from the network once the devices are known.

Discovering/collecting the devices in the network can be done in different ways. Most commonly, the information is retrieved from EMS or NMS which will hold a list of the devices they manage. Alternatively, the information can be collected by tracing the network from a known device. It is also possible to import lists of device IP addresses. Once a list of devices is available, it is possible to upload details of each device.

So, collection is the gathering of data from various sources over virtually any communication protocol, standards and data format. There is no widely adopted industry standard for network inventory and service configuration data. The source data may be produced by an EMS, NMS, NE, or NFV at certain time intervals or commands may have to be issued to start the process to produce the source files. The time required to produce the data may vary since status polling of network elements has a lower priority than the traffic. As said the collection can be done in two stages. First for discovery to create a list of devices, then for upload to get details of each device.

Data collection can be done either as a scheduled process or as an on demand job. Scheduled collections are managed in the discovery logic. This allows users to set up scheduled uploads at regular intervals such as every week, day, hour etc. Note that many of the data sources are primarily intended for running the network, not updating inventory, so too frequent uploads can cause complications.

On demand data collections can be initiated by SRI users through the GUI, or by external systems, for example workflow tools, through the APIs. On demand data collections are particularly useful for verifying small amounts of data required for a process. For example, this can be used to check if a port is actually free before activating services on it. The discovery logic can also be used to define the sequence of uploads from different sources, in cases where it is essential that information from one source is loaded before another.

Some information required for supporting processes is not available to collect from the active network. In most cases this information is spread across multiple legacy and Commercial Off-The-Shelf (COTS) solutions that have been grown and adapted over years. Migrating all this data into one inventory can be incredibly expensive and risky.

The SRI system can collect information from other systems using interfaces 45A, 45B, 45C, 45D, 45E, 45F, 45G, 45H to transform 46 the data into the SRI data model. The information can be collected on the fly, to be viewed and then discarded. This is especially useful when small pieces of information are needed from another system. Alternatively, the SRI system can store the information in its own database, and update changes regularly. This is useful for larger information sets that are updated rarely, so that a regular synchronization with the master database is sufficient.

To collect information from other systems is called as federation with other inventories. The federation allows existing systems that work well today, remain and continue to serve their purpose, while the information is available for new processes through the SRI system. Only small parts of the information are actually needed to transfer. A physical/outside plant inventory may have hundreds of object types for representing aspects of a physical network, such as power lines, property owners, routing rules, patching templates etc. SRI, however does not need to know most of this in order to automate the delivery of a service.

For a GPON (Gigabit-capable Passive Optical Network) access, for example, the SRI system only needs to know that a customer's home is connected with fibre to the PON (Passive Optical Network) port on a specific device. It does not need to know how many optical splitters or cabinets the signal passes through, or which pavement the fibre cable is buried under, where there are man-holes to access it, and which maintenance company is responsible for it. The mapping of data from the source system to SRI can be kept to a minimum. Instead of converting all of the data to SRI data model, it may be enough with 5% or even less.

The collected information is transformed from the equipment vendor's proprietary data model and format to the SID based data model used in the SRI system. This can be done using adapters for each data source (e.g. each type of EMS). When data is in a common model it is easier and more efficient to handle data from all network elements.

The information coming from the network can be provided in many various formats. This needs to be decoded in to a manageable format before the data can be transformed. The invention has a large set of off-the shelf converters for most of the commonly used formats.

The data models used by two different equipment vendors to describe the same network technology may be completely different. The information from different sources is transformed into a common data model. When data is collected from multiple sources, there is a chance that the same entity is present in more than one source. For example, a circuit connecting devices from two vendors could appear in the data collected from two different EMSs. In such cases it is important that this does not create a duplicate. If the entity in both sources has a common "reconciliation key", such as a circuit ID, SRI will recognize them as the same entity during import. SRI can consequently tie together data from two different sources to form a combined data set. The information stored in different data sources is rarely stored in the same form. For example, the circuit ID can be written differently in EMSs from different vendors. In order to identify the entity (e.g. the circuit) as the same, it is often necessary to translate the "reconciliation key" (e.g. the circuit ID) into a system wide standard. The discovery interfaces (NEIs) can convert the collected data to a common form. The discovery logic can further adapt the information by, for example, removing or appending prefixes or post-fixes. It is important that a common naming standard is agreed across all the data sources that need to be correlated. This needs to be applied to all information entities that exist in multiple sources.

The collection and transformation can be implemented with a dedicated interface/adapter for each data source or the transformation function can be a separate component 46 or components from the interfaces as showed in FIG. 4. Or the transformation can be proceed together with the interfaces and the component(s) 46. This can be a plug-in interface that understands the protocol that is used to communicate with the data source i.e. the interface can collect information with this protocol. The interface further recognize the format of the source information (e.g. ASCII files) i.e. the interface can decode the data into the target format (e.g. SRI import format). Further the interface recognize the data model of the source information (which often differs very much from vendor to vendor and even between different devices from the same vendor), so the interface can transform the data into the target data model (e.g. SRI).

The interfaces can be used to collect information from the live network through NMS, EMS or NEs, or NFVs but can also collect from other inventories, databases or systems.

So, the network data is collected, decoded and transformed into the SRI database format. The data from the network is imported into the SRI database where it is compared to the data in the inventory database. The discrepancies found from the comparison can be flagged to the end user and then resolved. The discrepancies may also be automatically handled, for example, for updating reasons if desired.

As said, the collected and transformed information can be compared (reconciled) with the information that is already stored in the SRI system. The result of this comparison is typically a set of differences (discrepancies) between the two information sets.

The SRI system has a specialized function for displaying discrepancies that are of interest to specific user groups. Users can identify and resolve the differences. Mostly this means that the version found in the network is "accepted"—e.g. when a new device has been found. Or it can be "rejected" if the user prefers the inventory version—e.g. if a device has "disappeared" due to communication problems with the EMS. When a change (discrepancy) is accepted, the inventory is updated according to the network. For example, a new device is created.

So, the reconciliation functionality compares the data from the network and the data from the inventory, and finds all discrepancies, which can be resolved, by either accepting the network or the inventory version. This can be arranged to be made automatically using certain predetermined rules. When reconciliation is done regularly, it ensures that the data quality can be trusted. It gives an up-to-date view of assets, supporting key operator processes such as fulfillment, asset management and assurance. So the system has the reconciliation/comparison component 49.

Data Comparison can be arranged in such a way that the Uploaded data is stored in a separate upload part of the inventory database, which is compared with the main part. If there are objects in the upload part that do not exist in the main part, they are tagged as "new discrepancy". This happens when new network elements are found, or new cards installed.

If there are objects that exist in both parts, but their information is different, they are tagged as "change discrepancy". This indicates that resources have changed. For example, a port has been connected, a card has been moved, or a sub interface has been reconfigured. When objects that exist in the main part are missing from the upload, they are marked as "delete discrepancy". This indicates that an item which has been seen before was not found. This can happen when elements and cards are removed, but can also be caused by communication failure between the network and SRI, so such discrepancies must be handled carefully.

After an upload from the network there can be large amount of discrepancies between the inventory data and the uploaded data. This is especially true for ports and logical configurations, which tend to change frequently due to customer orders or fault resolution. In an ideal situation, this data should always be updated by the process that initiates the change, but experience shows that this does not happen.

As said the SRI has a dedicated user interface for investigating discrepancies. It lets users search for specific types of discrepancies that they are responsible for handling, and resolve the differences with bulk functions. For example, users can find all the discrepancies that result from small bandwidth adjustments, because they are typically a result of assurance work to stabilize the line, and can be resolved easily in bulk.

The accepted discrepancies are merged with the main part of the inventory. New objects are created for newly discovered resources like network elements and cards. Attributes and relations are updated with the discovered status (e.g. port is in use or faulty) and "missing" objects are deleted. Rejected discrepancies are discarded, and the inventory remains unchanged.

The discrepancies can be resolved automatically. This is done by requesting SRI to run dedicated actions for this purpose. This logic can be set up with rules to verify that the converted data contains everything it is supposed to contain. If some of the expected data is missing it can run (preconfigured) corrective measures, or notify users of the problem.

In order to allocate or reallocate resource of the communication network, the inventive arrangement comprises a determinator component 47 to determining current resources of the communication network and current use of the resources, utilizing the collected information in the common format, and an investigator component 48 to investigate alternative ways to use the resources instead of the current use, and to suggest to use at least one alternative way in case it is more efficient than the current use. The determinator component 47 can utilize the reconciliation/comparison component 49. The determinator component 47, the reconciliation/comparison component 49 and the investigator component are described as separate components inside a larger SRI component 410 that provides a platform for it subcomponents. The SRI component can have also other components that are dedicated to do different functions described in this text. The components could also be separate components from the SRI component.

In addition the determinator component 47 (or another component in the system) can be arranged to calculate a prediction for resource allocation in the future. In order to do the prediction a trend or trends of how the resources are going to be used can be made, for example utilizing a suitable regression algorithm. The investigator component can be arranged to utilize the prediction made. So, the system can be even arranged to make a suggestion(s) taking into account the future needs.

Figure 5:
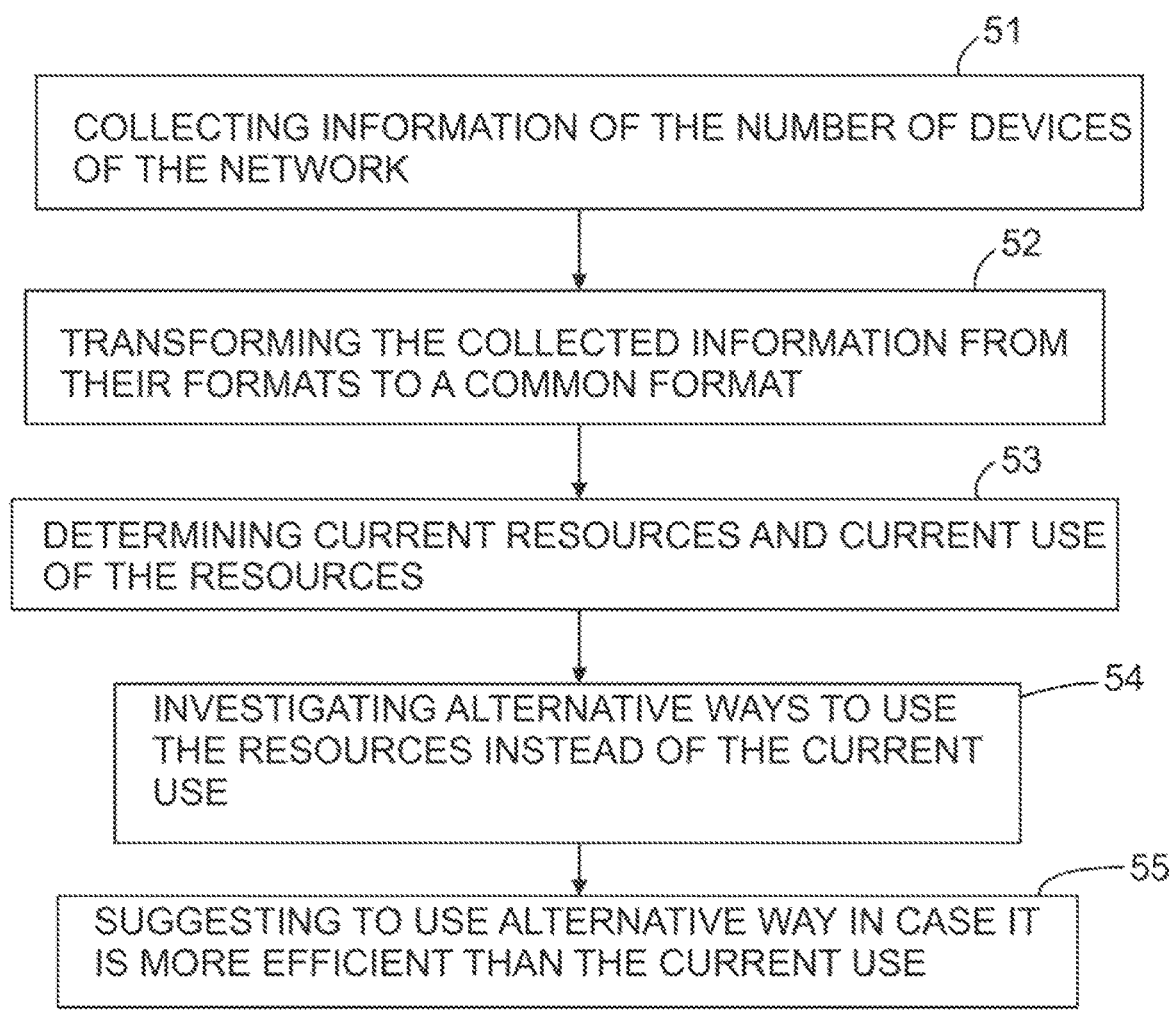
FIG. 5 illustrates a flow chart example of the method according to the invention.

FIG. 5 illustrate an example of the inventive method for allocating communication resources in a communication network that comprises a number of different devices and utilizes different technologies. In the method according to the invention information of the number of devices of the network is collected 51. The collected information from their formats is transformed to a common format 52. Current resources of the communication network and current use of the resources are determined utilizing the collected information in the common format 53. Alternative ways to use the resources instead of the current use are investigated 54, and a suggestion(s) is made to use at least one alternative way in case it is more efficient than the current use 55.

When collecting information of the number of devices of the network, NMSs, EMSs, NEs, NFV resources, and inventories of the network are utilized. Said transforming utilizes interfaces/adapters for the information format collected.

Further, when determining current resources of the communication network and current use of the resources, discrepancies between the collected information and already collected information are found, and the resources of the communication network and their current use is updated. New found NFV resources from the collected information are added to the current resources of the communication network. Said suggesting phase is arranged to suggest reallocating at least part of the resources of the current use to NFV resources.

As can be noted, the invention makes it possible to use NFV resources of the network conveniently with more traditional resources (like 3G etc.) Since the NFV technology reduces or even eliminates the need for traditional, dedicated network devices, the resource of the network (and all its sub networks) can be allocated in a more flexible and efficient way. The NFV reduces costs and improves resource usage. A server that is a firewall today can be a VPN gateway tomorrow with just a shift in software.

When allocating/reallocating the resources desired criteria can be taken into account such as free bandwidth, free slots, current use of different communication paths, consumption of electricity, fault in the network, reliability, quality of a communication path, etc. Even customer info like invoicing etc. could be used in the criteria. For example a lost function can be used with the criteria in order to calculate usefulness of current use and the alternative way when allocating/reallocating the resources or investigating the alternative ways to use the resources instead of the current use.

So, the inventive arrangement for allocating communication resources in a communication network that comprises a number of different devices and utilizes different technologies, comprises interfaces to collect information of the number of devices of the network, at least one component to transform the collected information from their formats to a common format, a determinator component to determining current resources of the communication network and current use of the resources, utilizing the collected information in the common format, and an investigator component to investigate alternative ways to use the resources instead of the current use, and to suggest to use at least one alternative way in case it is more efficient than the current use.

In addition, the arrangement comprises at least one memory 411, and at least one processor 412, which the software or a combination of software/hardware 41 utilizes. The memories/processors can be in any suitable place in the whole network. The arrangement also comprises interfaces for an external OSS/PSS system and for an external user interfaces. The arrangement is arranged to collect information of the number of devices of the network, NMSs, EMSs, NEs, NFV resources, and inventories of the network. The said transforming function utilizes adapters/interfaces for collecting the information.

Further the inventive arrangement can be arranged to determine current resources of the communication network and current use of the resources, to find discrepancies between the collected information and already collected information, and to update the resources of the communication network and their current use. The arrangement can add new found NFV resources from the collected information to the current resources of the communication network. Further, the arrangement can be arranged to suggest reallocating at least part of the resources of the current use to NFV resources. As said the arrangement is arranged to calculate usefulness of current use and the alternative way when investigating the alternative ways to use the resources instead of the current use.

It is evident from the above that the invention is not limited to the embodiments described in this text but can be implemented in many other different embodiments within the scope of the independent claims.

What is claimed is:

1. A method for allocating communication resources in a communication network that comprises a number of different devices and utilizes different technologies, the method comprising:
   collecting information of the number of devices of the communication network, wherein Network Management Systems (NMSs), Element Management Systems (EMSs), Network Elements (NEs), Network Function Virtualization (NFV) resources, and inventories of the communication network are utilized;
   transforming the collected information from their formats to a common format;
   determining current resources of the communication network and current use of the resources, utilizing the collected information in the common format;
   investigating alternative ways to use the resources instead of the current use;
   suggesting to use at least one alternative way in case the alternative way is more efficient than the current use, and
   employing the resources of the at least one alternative way in the communication network.

2. The method according to claim 1, wherein said transforming utilizes adapters/interfaces for the information collected.

3. The method according to claim 1, wherein when determining current resources of the communication network and current use of the resources, discrepancies between the collected information and already collected information are found, the resources of the communication network and their current use is updated.

4. The method according to claim 3, wherein in the phase for determining the current resource new found NFV resources from the collected information are added to the current resources of the communication network.

5. The method according to claim 1, wherein said suggesting phase is arranged to suggest reallocating at least part of the resources of the current use to NFV resources.

6. The method according to claim 1, wherein when investigating the alternative ways to use the resources instead of the current use, usefulness of current use and the alternative ways are calculated.

7. The method of claim 1, wherein the information allows for a tracing from one type of resource to another.

8. The method of claim 1, wherein the collecting is performed either by tracing an IP network or by scanning a known range of IP addresses.

9. The method of claim 1, wherein the information allows for a tracing from one type of resource to another.

10. The method of claim 1, wherein the collecting employs a ready-made list of devices.

11. An apparatus for allocating communication resources in a communication network that comprises a number of different devices and utilizes different technologies, the apparatus including at least one memory, at least one processor, and software for said allocating communication resources, the apparatus comprising:
    interfaces to collect information of the number of devices of the communication network;
    at least one component to transform the collected information from their formats to a common format;
    a determinator component that includes at least one of said at least one said memory, said at least one processor, or said software, for determining current resources of the communication network and current use of the resources, utilizing the collected information in the common format; and
    an investigator component to investigate alternative ways to use the resources instead of the current use and to suggest to use at least one alternative way in case the at least one alternative way is more efficient than the current use,
    wherein the investigator is arranged to calculate usefulness of current use and the alternative way when investigating the alternative ways to use the resources instead of the current use, and wherein said apparatus employs the resources of the at least one alternative way in the communication network.

12. The apparatus according to claim 11, wherein the arrangement comprises at least one memory, and at least one processor.

13. The apparatus according to claim 12, wherein the arrangement comprises interfaces for an external OSS/PSS system and for an external user interfaces.

14. The apparatus according to claim 13, wherein the interfaces are arranged to collect information of the number of devices of the communication network, NMSs, EMSs, NEs, NFV resources, and inventories of the network.

15. The apparatus according to claim 14, wherein a transforming by said at least one component utilizes adapters/interfaces for collecting the information.

16. The apparatus according to claim 15, wherein the determinator is arranged to determine current resources of the communication network and current use of the resources, to find discrepancies between the collected information and already collected information, and to update the resources of the communication network and their current use.

17. The apparatus according to claim 16, wherein the determinator is arranged to add a new found NFV resources from the collected information to the current resources of the communication network.

18. The apparatus according to claim 17, wherein the investigator is arranged to suggest reallocating at least part of the resources of the current use to NFV resources.

19. The apparatus of claim 11, wherein the interfaces collect the information either by tracing an IP network or by scanning a known range of IP addresses.

20. The method of claim 11, wherein the interfaces collect the information by employing a ready-made list of devices.

* * * * *